Patented Feb. 11, 1936

2,030,695

UNITED STATES PATENT OFFICE 2,030,695

ELECTRIC LAMP

Bernhard Erber, Vienna, Austria

No Drawing. Application April 22, 1933, Serial No. 667,511. In Austria May 7, 1932

3 Claims. (Cl. 176—129)

This invention relates to a new and improved incandescent electric lamp the luminous body of which consists of the carbide of tantalum or of a metal of the tantalum group, and to a method of manufacturing the same.

Repeated attempts have already been made to produce incandescent electric lamps with a luminous body of tantalum carbide, since tantalum carbide possesses an extremely high melting point, and could therefore be heated to a temperature promising a very high degree of photometric efficiency. The proposals hitherto made, which have tended mainly in two directions, have not, however, led to any practically useful results. On the one hand the attempt has been made to employ luminous bodies consisting entirely of tantalum carbide. Since, however, the attempts hitherto made in this direction have only resulted in the production of tantalum carbide bodies which possess but little mechanical strength, which have pronounced crystalline structure, and which above all are rigid and highly brittle, lamps made with such luminous bodies could not satisfy the requirements made thereof. The second proposal, which aimed, generally speaking, at manufacturing the luminous body not entirely of tantalum but of a metallic core of tungsten, tantalum, or rhenium coated with tantalum carbide, has likewise proved unsuccessful in utilizing to the full the favorable properties of tantalum carbide as a material for the luminous body of an incandescent electric lamp, since both tungsten and also tantalum and rhenium have melting points which are considerably below the melting point of tantalum carbide, so that if these metals be used as a filament core, the possibility of utilizing the main advantage of tantalum carbide, that is its exceptionally high melting point, is ruled out from the start. With the employment of tungsten in the manner indicated, there results the further disadvantage that the same combines with tantalum carbide to form tungsten carbide, thus liberating metallic tantalum which evaporates at a comparatively very low temperature, so that the luminous body becomes useless after quite a short time. Rhenium and tantalum do not combine with the tantalum carbide to form compounds which would render the lamp unfit for use, but their melting points are still lower than that of tungsten, so that in these cases only very inefficient working of the lamp would be possible, or only very low intrinsic brilliancy could be obtained.

The present invention provides a luminous body for incandescent electric lamps which permits of the full utilization of the valuable properties of tantalum carbide or of the carbide of one of the metals of the tantalum group, while completely eliminating the disadvantages of the previous proposals. In accordance with the invention, the carbide of tantalum is again carried upon a core, but this core consists not of metal but of material which fulfills simultaneously the two following requirements: namely, this material must have a melting point which is not appreciably below and preferably even above that of tantalum carbide, and, secondly, this material may not lead to deleterious alteration of the tantalum carbide coating through spontaneous carbide formation. A material which fulfills these requirements simultaneously, and which in addition possesses the further advantage of reconverting any metallic tantalum happening to be formed under working conditions into tantalum carbide, has been found in carbon in the solid form, this material being employed, in accordance with the invention, as the carrier of the tantalum carbide coating. The carbon filament does not combine with tantalum carbide, and with metallic tantalum it only combines, in a highly desirable manner, to form tantalum carbide. Destruction neither of the tantalum carbide coating nor of the carbon core can thus occur in consequence of chemical conversion or double decomposition, but on the contrary, if the formation of metallic tantalum should occur intermittently, this metal is at once regenerated to carbide by the carbon content of the filament core. The melting point of carbon is considerably above that of tantalum carbide, so that the filament can be heated, without regard for the carbon core, up to the permissible or desirable limit for the tantalum carbide.

The tantalum carbide luminous bodies made in accordance with the invention can be produced with a highly uniform superficial layer which permits of the maintenance of the mechanical properties of the carbon core employed. If care be taken that the tantalum carbide coating encloses the carbon core at all points, that is to say in a perfectly coherent layer, diffusion or atomization of the carbon filament is prevented with certainty, even when the temperature employed be far above that at which this carbon filament would atomize if it were placed, for example, in the exposed condition in vacuo. The consumption of the carbon core, insofar as this takes place for the regeneration of the tantalum carbide layer during working, is without any detrimental influence on the working capacity of the luminous body. Even if the carbon core were to become for the greater part or even entirely consumed for the formation of tantalum carbide, in the course of long use, the resultant filament of pure tantalum carbide still possesses sufficient elasticity to remain technically useful.

In order to increase the heat intensity, the carbon filament employed as the carrier for the metallic carbide coating can be coiled or otherwise laid in close loops during the process of manufacture, so that in the finished luminous body an accumulation of heat or a mutual heating up of the individual turns is effected. This shaping or arrangement of the incandescent filament proves particularly advantageous if the lamp is to be provided with a gas filling, which in this case would preferably be a rare gas filling. In general a filling of this nature, and more particularly a rare gas filling, will always be advisable, since the same still further reduces the possibility of the formation of metallic tantalum through dissociation at the surface of the tantalum carbide which is in any case very remote in the present instance.

The manufacturing of a tantalum carbide luminous body in accordance with the present invention is preferably carried out by first depositing on the carbon filament core tantalum in the metallic form, and in a continuous coherent adhering coating, and then converting this metallic tantalum into tantalum carbide in the course of a further stage of the manufacturing process. For the purpose of first depositing metallic tantalum on to the carbon filament this latter is heated for example in a tantalum-halogenous atmosphere, whereby the metal is deposited from the gaseous phase on to the glowing carbon filament in a manner known per se. It is advantageous at this stage of the process not to heat the carbon filament to too high a temperature, so that a uniform, homogeneous, adhering coating of the pure metallic tantalum may be formed, without the occurrence of carbide formation at this stage. After the metallic tantalum coating has attained the required density and thickness, this tantalum is converted into the carbide by the addition of carbon. This addition of carbon can be effected either exclusively from the carbon filament core, or the carbon can be introduced, at all events for the greater part, from the outside. In the latter case the carbon filament coated with metallic tantalum is exposed, under the application of heat, to an atmosphere containing one or more carbon compounds whereas when the carbon required for the carbide formation is derived from the carbon filament core only the tantalum-covered carbon filament is heated in an atmosphere of rare gas or in vacuo. The required temperature, at which the tantalum reacts with the carbon, is of the order of 1200 to 1600 degrees centigrade, and the heating can be effected either by means of resistance heating or in a furnace. The heating must be carried out carefully and slowly, so that the metallic tantalum shall not evaporate before the tantalum carbide is formed. Particular care must be taken in this direction when the heating is effected in vacuo, while when the heating is carried out in a rare gas atmosphere the danger of evaporation of the metallic tantalum is considerably less. When the tantalum-covered carbon filament is heated in a carbon-containing atmosphere the process can be so directed, by suitable selection of the carbon compounds (preferably carbohydrates) to be decomposed and by the mode of heating adopted, that either both the carboniferous atmosphere and also the carbon filament core are utilized to a considerable extent for supplying the necessary carbon, or the absorption of carbon by the tantalum takes place exclusively or at least for the greater part only from the carboniferous atmosphere. The methods of carbide formation with a supply of carbon from the outside or with the simultaneous supply of carbon from the inside and from the outside are preferable to the method with carbon derivation from within alone, since the surface of the carbon filament core is spared thereby.

It will be clear without further explanation that the carbon filament must be very carefully degassed and cleansed before being coated with tantalum, so that the coating may not be injured by deleterious impurities driven out of the carbon filament in the course of heating.

It has proved advisable to carry out the manufacturing of the tantalum carbide-coated carbon filament outside the bulb of the incandescent lamp, although it is of course possible to carry out the manufacturing process within the lamp itself. Manufacturing outside the lamp is preferable for the reason that it can happen that the filament does not acquire the same temperature at all points, with the result that the coating is not uniform at all points. More particularly in the case of resistance heating is it to be expected that lower temperatures will be obtained at the ends nearest the current leads than at the remaining parts of the filament, so that these ends could become sources of defectiveness. If, on the other hand, the manufacturing of the filament be carried out outside the lamp, there is no difficulty in removing such possibly defective or not quite perfect portions of the filament, it being merely necessary to make the latter somewhat longer originally than will be required for the final use in the lamp. The finished filament is then introduced in a known manner into an incandescent lamp stem, in which connection it can be advatageous additionally to protect the ends of the filament and the leading-in wires by the application of tantalum carbide thereto.

It is also possible to employ, in a manner analogous to that described for tantalum carbide, the carbides of the homologues of tantalum, namely of niobium and vanadium. The latter materials have a lower melting point than tantalum carbide, so that the degree of intrinsic brilliancy obtainable remains below that obtainable with tantalum carbide.

I claim:

1. A luminous body of an incandescent lamp comprising a filament consisting of solid carbon and a tightly adherent homogeneous and coherent coating enclosing said filament consisting of a carbide of one of the metals of the tantalum group.

2. A luminous body of an incandescent electric lamp comprising a coil filament having a carbon core and having a coherent, homogeneous, tightly adherent tantalum carbide coating for said core.

3. An incandescent electric lamp, said lamp being filled with a rare gas, and comprising an incandescent filament having a carbon core and a coherent, homogeneous, tightly adherent tantalum carbide coating therefor.

BERNHARD ERBER.